(12) United States Patent
Shi

(10) Patent No.: US 6,320,855 B1
(45) Date of Patent: Nov. 20, 2001

(54) METHOD AND SYSTEM FOR INITIATING IDLE HANDOFF IN A WIRELESS COMMUNICATIONS SYSTEM

(75) Inventor: Yu Shi, San Diego, CA (US)

(73) Assignee: Qualcom Incorporated, San Diego, CA (US)

( * ) Notice: Subject to any disclaimer, the term of this patent is extended or adjusted under 35 U.S.C. 154(b) by 0 days.

(21) Appl. No.: 09/392,868

(22) Filed: Sep. 9, 1999

(51) Int. Cl.[7] ........................................... H04Q 7/00
(52) U.S. Cl. ........................... 370/332; 370/335; 455/436
(58) Field of Search ................................ 370/331, 332, 370/335, 342, 252; 455/442, 436, 437, 440, 441, 443, 444, 438, 439

(56) References Cited

U.S. PATENT DOCUMENTS

| | | | | |
|---|---|---|---|---|
| 5,854,785 | * | 12/1998 | Willey | 370/332 |
| 5,920,550 | * | 7/1999 | Willey | 370/332 |
| 5,926,503 | * | 7/1999 | Kelton et al. | 375/148 |
| 5,953,320 | * | 9/1999 | Williamson et al. | 370/331 |
| 6,021,122 | * | 2/2000 | Tiedemann, Jr. | 370/331 |
| 6,144,649 | * | 11/2000 | Storm et al. | 370/335 |
| 6,178,164 | * | 1/2001 | Wang et al. | 370/331 |

FOREIGN PATENT DOCUMENTS

| | | | | |
|---|---|---|---|---|
| 0454638 | 12/1991 | (EP) | ............................. | H04B/7/26 |
| 0038466 | 6/2000 | (WO) | ............................. | H04Q/7/38 |

\* cited by examiner

*Primary Examiner*—Chau Nguyen
*Assistant Examiner*—Soon-Dong Hyum
(74) *Attorney, Agent, or Firm*—Philip R. Wadsworth; Charles D. Brown; Thomas Streeter

(57) ABSTRACT

A system and method for deciding whether to initiate an idle handoff in a wireless communications system is disclosed. A mobile station having an integrated chip and software instructions executed by that chip obtain samples at first and second times of the pilot signals radiated by first and second base stations. A determination is then made whether to initiate an idle handoff based upon a comparison of the total strengths of the second time samples and a position-weighting term with a design constant. The position-weighting term accounts for the change in position of the mobile station relative to the first and second base stations in between the first and second sample times. The position-weighting term may itself be weighted to account for the strength of the earliest arriving multipath component of the first and second pilots relative to the total strength of the first and second pilots.

25 Claims, 2 Drawing Sheets

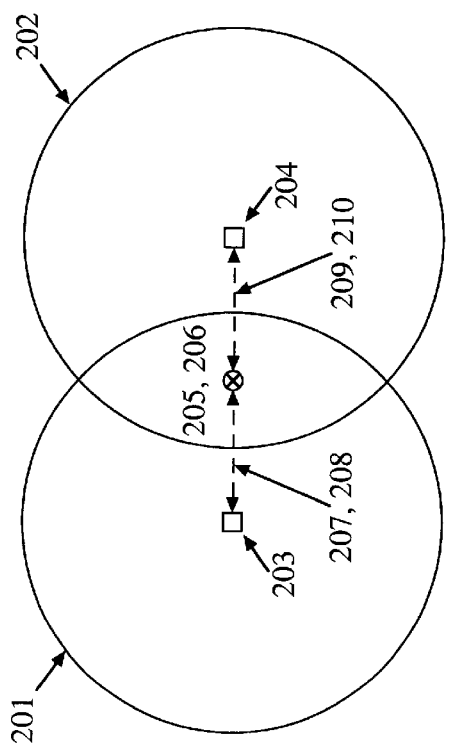
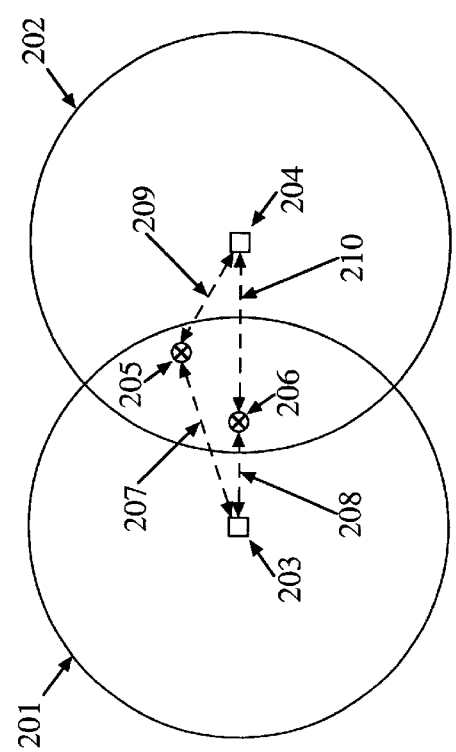
FIG. 2A
FIG. 2B

METHOD AND SYSTEM FOR INITIATING IDLE HANDOFF IN A WIRELESS COMMUNICATIONS SYSTEM

BACKGROUND OF THE INVENTION

I. Field of the Invention

The present invention relates to wireless communication devices in general, and to a system and method for initiating idle handoffs between base stations in particular.

II. Description

Communication systems have been developed that allow transmission of information signals from a base station location to a physically distinct user or subscriber location. Both analog and digital methods have been used to transmit these information signals over communication channels linking the base station and user locations. Digital methods tend to afford several advantages relative to analog techniques, including for example, improved immunity to channel noise and interference, increased capacity and improved security of communication through the use of encryption.

In transmitting an information signal in either direction over a communication channel, the information signal is first converted into a form suitable for efficient transmission over the channel. Conversion, or modulation, of the information signal involves varying a parameter of a carrier wave on the basis of the information signal in such a way that the spectrum of the resulting modulated carrier is confined within the channel bandwidth. At the recipient location the original message signal is replicated from a version of the modulated carrier received subsequent to propagation over the channel. Such replication is generally achieved by using an inverse of the modulation process employed during message transmission.

Modulation facilitates multiplexing, i.e., the simultaneous transmission of several signals over a common channel. Multiplexed communication systems generally include a plurality of remote subscriber units or mobile stations requiring intermittent service rather than continuous access to the communication channel. Systems designed to enable communication with a selected subset of a full set of subscriber units are called multiple access communication systems. A particular type of multiple access communications system, known as a code division multiple access (CDMA) modulation system, may be realized in accordance with spread spectrum techniques. In spread spectrum systems, the modulation technique utilized results in spreading of the transmitted signal over a wide frequency band within the communication channel. Other multiple access communication system techniques include, for example, time division multiple access (TDMA) and frequency division multiple access (FDMA). CDMA techniques however, offer significant advantages over other multiple access communication system techniques. The use of CDMA techniques in a multiple access communication system is disclosed in U.S. Pat. No. 4,901,307, issued Feb. 13, 1990, entitled "SPREAD SPECTRUM MULTIPLE ACCESS COMMUNICATION SYSTEM USING SATELLITE OR TERRESTRIAL REPEATERS," assigned to the assignee of the present invention and incorporated herein by reference.

In the above referenced U.S. Pat. No. 4,901,307, a multiple access technique is disclosed where a large number of mobile system users each having a transceiver communicate through satellite repeaters or terrestrial base stations using CDMA spread spectrum communication signals. CDMA modulation in turn allows the frequency spectrum dedicated to cellular telephony to be reused multiple times, resulting in a significant increase in system user capacity. In fact, the same frequency band is used in each cell or sector of a cell within the cellular geographic serving area (CGSA) of the CDMA system. Thus, the use of CDMA results in a much higher spectral efficiency than can be achieved using other multiple access techniques.

In a wireless communications channel, the presence of obstacles in the environment such as buildings, trees, mountains, cars and the like often results in the reflection of wireless communications signals transmitted by either mobile or base stations. This phenomenon is referred to as a multipath propagation environment because any particular wireless communications receiver (such as a mobile station) may receive a plurality of signals corresponding to a single signal transmitted by a particular wireless communications transmitter (such as one or more base stations), each of the plurality of received signals having traveled a different path to the receiver. Typically, the mobile radio channel also is a time varying multipath channel. In other words, the stream of pulses that would be received following the transmission of an ideal pulse over a mobile radio channel would change in time location, attenuation and phase depending on when the ideal pulse were transmitted. This is due in part to relative motion between the wireless transmitters and the environmental obstacles. It also due in part to fading, which occurs when multipath signals are phase shifted to such a degree that destructive interference with one another occurs, and path loss, which is a result of atmospheric effects on wireless communications signals.

In narrowband modulation systems the multipath characteristics of wireless communications channels often results in significantly impaired system performance. In CDMA systems though, the high speed PN code modulation allows a receiving station to receive and discriminate among signals from a single transmitting station that have traveled over several distinct propagation paths. This ability to discriminate between multipath signal transmissions markedly reduces the severity of signal fading in such systems. Indeed, the ability to discriminate between multipath signal transmissions actually provides significant advantages in CDMA systems because each multipath signal typically exhibits independent fading characteristics and may be exploited without regard to the signals arriving via other paths. A receiver design allowing one to exploit these multipath signals is described in U.S. Pat. No. 5,109,390 entitled "Diversity Receiver in a CDMA Cellular Telephone System," assigned to the assignee of the present invention and incorporated herein by reference. Provided the phase offset (i.e., the arrival time) of the multipath signals is 1 $\mu$s or more, the diversity receiver design referred to above allows independent tracking and demodulation of the diverse signals. Once demodulated, the signals may then be used independently or combined to form composite signals.

An exemplary cellular system is depicted in FIG. 1. Such systems generally include a plurality of mobile stations 10, a plurality of base stations 12, a base station controller (BSC) 14, and a mobile switching center (MSC) 16. The MSC 16 is configured to interface with a conventional public switch telephone network (PSTN) 18. The MSC 16 is also configured to interface with the BSC 14. The BSC 14 is coupled to each base station 12. The base stations 12 may also be known as base station transceiver subsystems (BTSs) 12. Alternatively, "base station" may refer collectively to a BSC 14 and one or more BTSs 12. BTSs 12 may be referred to as "cell sites" 12, or sectors of a given BTS 12 may be referred to as cell sites. The mobile stations 10 are typically cellular telephones 10, and the cellular telephone system is advantageously a spread spectrum CDMA system configured for use in accordance with the IS-95 standard. Each of the base stations 12 and the mobile stations 10 typically include at least one transceiver (not shown), at least one integrated chip (not shown) and software (not shown) executed by those chips for carrying out the numerous functions and operations required of each in a wireless communications system. For instance, and by way of example only, many of the operations involved in the modulation and demodulation of wireless communications signals are controlled by software executed by integrated chips. Integrated chips running software also control many of the operations involved in the transfer of mobile station control from one base station to another, typically referred to as handoff. One skilled in the art will however appreciate that such operations need not be implemented or controlled either completely or partially with integrated chips. One skilled in the art will also appreciate that the term transceiver also contemplates the use of dedicated transmitters and receivers.

For each cell within the system there are two links consisting of the forward and reverse links. During typical operation the base stations 12 receive sets of reverse link signals from some or all of the mobile stations 10. The mobile stations 10 are conducting telephone calls or other communications. Each reverse link signal received by a given base station 12 is processed within that base station 12. The resulting data is forwarded to the BSC 14. The BSC 14 provides call resource allocation and mobility management functionality, including the orchestration of soft handoffs between base stations 12. The BSC 14 also routes the received data to the MSC 16, which provides additional routing services for interface with the PSTN 18. Similarly, the PSTN 18 interfaces with the MSC 16 and the MSC 16 interfaces with the BSC 14, which in turn controls the forward link signals from the base stations 12 to the mobile stations 10.

Where the wireless communications system depicted in FIG. 1 is a CDMA system configured in accordance with IS95, the forward and reverse links are comprised of forward and reverse CDMA channels respectively. The reverse CDMA channel comprises one or more code channels that are transmitted on a CDMA frequency assignment using a particular pilot PN offset and consist of a number of access channels and reverse traffic channels. Data transmitted on the reverse CDMA channel is convolutionally encoded for random-error correction, block interleaved for protection from burst errors, modulated by 64-ary Walsh codes, and direct-sequence spread by a long PN code of period $2^{42}-1$ chips prior to transmission.

The forward CDMA channel comprises one or more code channels that are transmitted on a CDMA frequency assignment using a particular pilot PN offset. Each base station uses a time offset of the pilot PN sequence (called a spreading pseudonoise sequence) to identify a forward CDMA channel. Time offset can be reused within a CDMA system. Each code channel transmitted on the forward CDMA channel is orthogonally spread by a Walsh function to provide orthogonal channelization among all code channels and is then spread by a quadrature pair (i.e., in-phase and quadrature-phase) of pilot PN sequences in order to transmit them by Quadrature Phase Shift Keying (QPSK) waveform.

The code channels comprising the forward CDMA channel consist of the pilot channel, synch channel, paging channel, a number of forward traffic channels. A typical forward CDMA channel consists of 64 code channels in total, one pilot channel, one synch channel, seven paging channels, and 55 forward traffic channels. The synch channel is assigned to the code channel number 32 ($W_{32}$) which transports synchronization messages to mobile stations 10 from base stations 12. Mobile stations 10 use the synch channel, which is an encoded, interleaved, spread and modulated spread spectrum signal, to acquire initial time synchronization. The paging channels also are encoded, interleaved, spread and modulated spread spectrum signals, and are typically assigned to code channel numbers one through seven ($W_1$–$W_7$) in sequence. Control information and paging messages are transmitted by base stations 12 to mobile stations 10 on the paging channels. The forward traffic channels are used for the transmission of user and signaling traffic from base stations 12 to a specific mobile station 10 during a call. The maximum number of forward traffic channels is equal to 63 less the number of synch and paging channels operating on the same forward CDMA channel. The pilot channel however, is an unmodulated, direct-sequence spread spectrum signal transmitted at all times by each base station 12 in a CDMA wireless communications system. Mobile stations 10 use the pilot channel for a number of purposes, including as a phase reference for coherent demodulation, to acquire forward CDMA channel timing, and a key reference point for deciding whether and when to perform an idle handoff. Data transmitted on either the forward or reverse CDMA channels are grouped in 20 ms frames, a frame being the basic timing interval in CDMA systems.

Call processing, which refers to the techniques of message flow protocols between a mobile and a base station in a wireless communications system, is typically classified into two parts, mobile station call processing and base station call processing. In a CDMA system base station call processing is comprised of pilot and synch channel processing, paging channel processing, access channel processing and traffic channel processing. During pilot channel processing the base station transmits the pilot signal on the pilot channel. During traffic channel processing the base station uses the forward and reverse CDMA traffic channels to communicate with a mobile station that is in the mobile station control on the traffic channel state. During access channel processing the base station monitors the access channel to receive messages which the mobile station sends while in the mobile station is in the system access state. During paging channel processing the base station transmits messages on a paging channel being monitored by a mobile station in the mobile station access state or the mobile station idle state. Information sent by a base station to a mobile station on a paging channel includes overhead information, which is information needed for the mobile to operate with the base, and direction information, which is an instruction for the mobile to perform some operation. Overhead information is sent via access parameters messages, CDMA channel list messages, system parameters messages, and neighbor list messages. Direction information is sent via a number of different message types including, by way of example only, base station acknowledgement orders, channel assignment messages, registration request messages, paging messages and slotted paging messages if the base station determines that the mobile station is monitoring the paging channel in the slotted mode.

Mobile station call processing in CDMA systems on the other hand is comprised of four mobile station states, the mobile station initialization state, the mobile station idle state, the system access state and the mobile station control on the traffic channel state. In the initialization state the mobile station selects and acquires a wireless communications system to use, in either analog or CDMA mode operation (assuming the mobile supports multiple modes of operation). In the system access state the mobile station sends messages to the base station on the access channel(s) and receives messages from the base station on the paging channel to which it is assigned. These messages are sent and received by the mobile station in various substates of the system access state, including the mobile station order/ message response substate and the page response substate. In the mobile station control on the traffic channel state the mobile station communicates with the base station via the forward and reverse CDMA channels.

In the mobile station idle state, the mobile station monitors the paging channel to which it is assigned. While in this state the mobile can receive messages, receive an incoming call (i.e., terminated call), initiate a call (i.e., originated call), initiate a registration or initiate a message transmission. Upon entering the mobile station idle state the mobile sets its code channel, the paging channel data rate and engages in paging channel supervision. The exact nature of the paging channel supervision will depend on whether the mobile is operating in the slotted or nonslotted mode. When operating in the nonslotted mode, the mobile monitors its paging channel at all times. The mobile resets a timer to $T_{30m}$ seconds whenever it receives a valid message on the paging channel. $T_{30m}$ is the maximum time allowed by the system to receive a valid paging channel message. If the timer expires before a valid message is received, the mobile station declares a loss of the paging channel.

If the mobile station is operating in the slotted mode of the mobile station idle state, it will set a timer for $T_{30m}$ seconds at the start of the first slot during which the mobile monitors the paging channel. In a CDMA system the paging channel is divided into 80 ms slots, and mobile stations operating in the slotted mode typically monitor the paging channel during only one or two slots per slot cycle. The mobile station disables the timer and generally stops or reduces its processing for power conservation when it is not monitoring the paging channel. The mobile will then reset the timer for $T_{30m}$ seconds whenever a valid message is received on the paging channel, even if not addressed to that particular mobile station. If however the timer expires while the mobile is monitoring the paging channel, the mobile will declare a loss of the paging channel. In either mode of operation though, slotted or nonslotted, the mobile station will enter the system determination substate of the mobile station initialization state upon declaring a loss of its paging channel.

When a mobile station is in the mobile station idle state and monitoring the paging channel for any incoming messages, it may travel farther from its current base station and towards the coverage area of another base station or sector of its current base station. When this occurs the quality of the received signals from the current base station typically deteriorates while the quality of the received signals from the neighboring base station or sector improves. Provisions have therefore been made for mobiles in the idle state to initiate transfer of control from the current base station to another base station (i.e., idle handoff procedures). In present wireless communications systems, when a mobile station detects and determines that it is receiving a pilot signal from a base station other than its current base station and that signal is sufficiently stronger than the pilot signal of its current base station (typically referred to as the active pilot signal), the mobile station will initiate an idle handoff to the new base station. Variations in the received signal strength of the pilot signals may and often do however, occur for reasons other than movement of the mobile station significantly further from its current base station towards another base station. For instance, slight variations in the position of the mobile can result in significant changes in the multipath propagation environment. When this occurs an unnecessary and unwanted idle handoff may be initiated if the received signal strength of the active pilot drops quickly to a small value relative to another pilot being tracked by the mobile due to severe fading conditions. The situation is often exacerbated when the mobile initiates yet another idle handoff back to the original base station once the severe fading conditions subside.

One skilled in the art can therefore appreciate that the current idle handoff algorithm has weaknesses that fail to ensure unnecessary idle handoffs are not initiated due to fleeting variations in the received signal strength of pilot signals. Moreover, when a mobile station initiates an idle handoff it cannot operate in the slotted mode, thereby drawing unnecessary power from its battery or other power source, system resources are taxed and the likelihood of failing to receive messages addressed to it increases. Hence, some means of preventing unwanted and unnecessary idle handoffs from being performed due to passing variations in the received signal strength of the pilot channels is needed.

SUMMARY

The present invention is directed to a system and method for initiating idle handoff of a mobile station in a wireless communications system, wherein first and second samples of a first pilot signal radiated by a first base station are obtained, the first sample occurring at a first time and the second sample occurring at a second time, third and fourth samples of a second pilot signal radiated by a second base station are obtained, the third sample occurring at the first time and the fourth sample occurring at the second time, it is determined whether the sum of the difference between the total strengths of the second and fourth samples and a position-weighting term is less than a first design parameter, and an idle handoff of said mobile station from said first base station to said second base station is initiated if the sum is less than the first design parameter.

BRIEF DESCRIPTION OF THE DRAWINGS

The features, objects and advantages of the present invention will become more apparent from the detailed description set forth below when take in conjunction with the drawings, in which like reference characters identify correspondingly throughout and wherein:

FIGS. 2A and 2B illustrate how the decision whether to initiate an idle handoff in a wireless communications system may be effected by the invention.

DETAILED DESCRIPTION OF THE PREFERRED EMBODIMENTS

Figure 1:
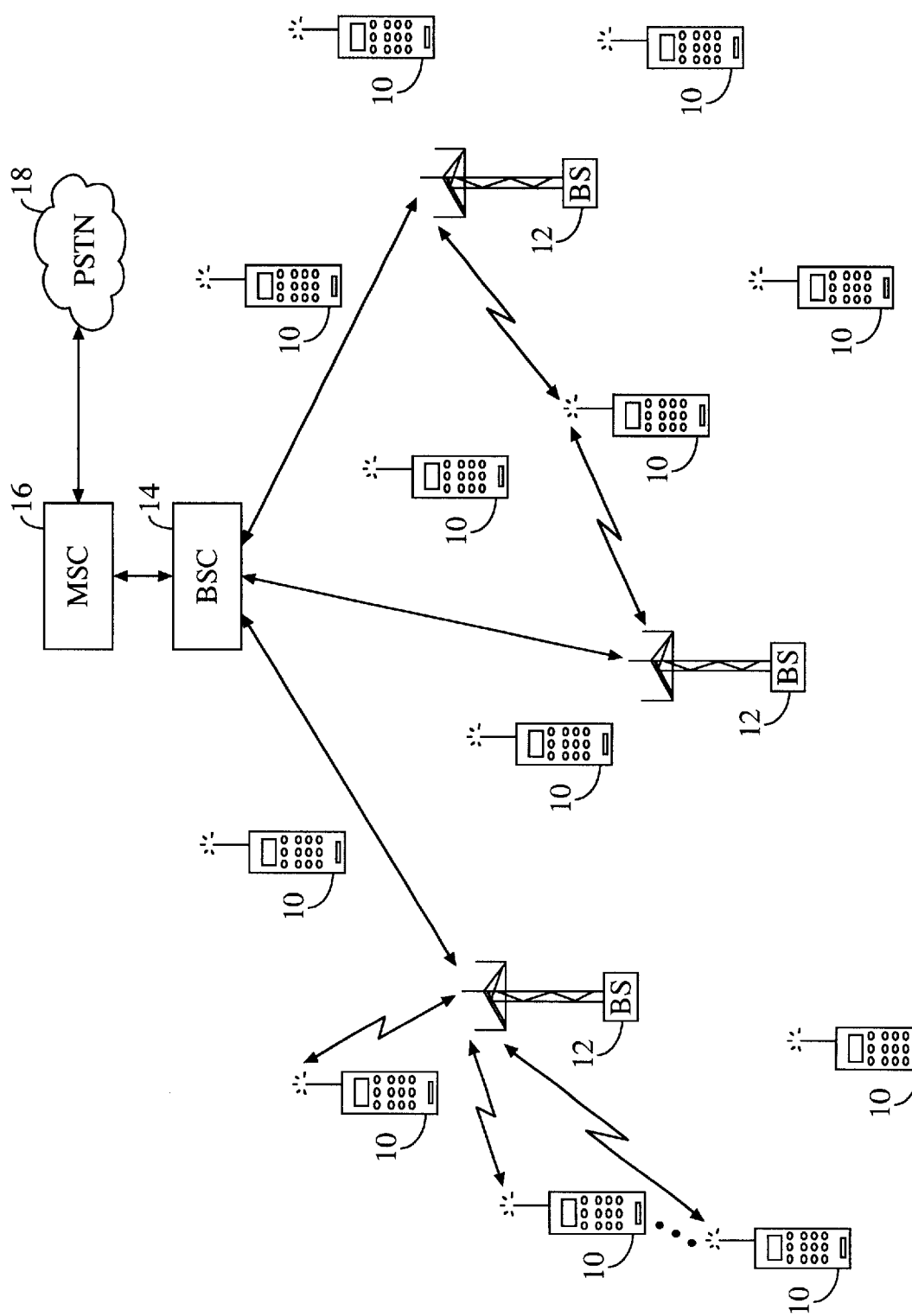
FIG. 1 is a diagram of an exemplary cellular system.

Because rapid variations in the multipath propagation environment can trigger unnecessary idle handoffs in current wireless communications systems, the present invention provides for an improved method and system for deciding whether to initiate an idle handoff. In a preferred embodiment of the invention, this is achieved through the use of a position-weighted idle handoff algorithm in an IS-95 configured CDMA system. The present invention is not however limited to IS-95 configured or even CDMA systems, but may be implemented without the exercise of inventive faculty in any wireless communications system wherein provisions are made for idle handoffs. A description of the preferred embodiment follows.

As noted above, in the mobile station idle state the mobile station continuously monitors the signal strength of the active pilot and searches for pilot channel signals from other base stations in the vicinity of the mobile while operating in the nonslotted mode. The same is true while operating in the slotted mode, with the monitoring and searching limited to the appropriate paging channel slots for that particular mobile. Like other channels in a CDMA system, pilot channels are identified by their phase or time offsets relative to the zero offset PN sequence. The pilot channel search parameters are therefore expressed in terms of time offsets, and are divided into three sets. The active set is comprised of the pilot offset of the forward CDMA channel whose paging channel the mobile is currently monitoring for messages. The neighbor set is comprised of the pilot offsets for the pilot channels of neighboring base stations that are likely candidates for an idle handoff. The members of the neighbor set are specified in messages such as the neighbor list message periodically received by the mobile on the paging channel. The third set is the remaining set, which is comprised of all the possible pilot offsets in the current CDMA frequency assignment but excluding the members of the active and neighbor sets. The mobile station typically supports a neighbor set of at least 20 pilot offsets in size.

The base station also specifies, in addition to the pilot offsets, search windows for each of the pilot sets. In other words, the base station specifies a range of PN offsets or a window in which the mobile station is to search for the multipath components of each pilot in each of the sets. Once the mobile has detected a pilot with a sufficiently strong signal and begins tracking that pilot, it will make a record for each multipath component of the pilot that it is receiving and continue searching the PN space for other pilots in the neighbor or remaining sets. In subsequent searches of the PN space, the mobile will center the search window of its scanning receiver around the earliest arriving multipath component of each pilot for which it has made a record. The mobile station measures the total strength, $E_X$, of each pilot X in a given search window by adding the ratios of received pilot energy per chip, $E_{Xc}$, to total received spectral density (noise and signals), $I_{Xo}$, of at most k usable multipath components, where k is the number of demodulating elements supported by the mobile. A usable multipath component is one that is sufficiently strong to be tracked, and that if used, would not cause prohibitive frame errors or power control bit errors. The arrival time, $T_i$, for each pilot X being searched is the time of occurrence, as measured at the mobile station antenna connector, of the earliest arriving usable multipath component of the pilot, and is measured relative to the time reference of the mobile station in units of PN chips. Hence, the phase or PN offset of the received pilot multipath component corresponds to the arrival time of that component. The mobile computes pilot phase, $\phi_x$, from the following relationship:

$$\phi_x = (T_i + 64 * \text{PILOT\_PN}) \bmod 2^{15},$$

where PILOT_PN is the PN sequence offset index of the pilot X being searched.

Also noted above was the conventional algorithm used in current wireless communications systems for determining whether an idle handoff should be performed. Namely, whenever the mobile station determines that the signal strength of a pilot channel emitted by a nearby base station is sufficiently stronger than that of the active pilot channel signal an idle handoff is initiated. This energy comparison algorithm is typically expressed mathematically as follows:

If $E_A(T_i) - E_B(T_i) < H$, then initiate idle handoff to base station B, where $E_A$ is the signal strength in dB of the pilot channel emitted by the active base station at the mobile, $E_B$ is the signal strength in dB of the pilot channel emitted by base station B at the mobile, and H is a design parameter. A typical value for H is 2, indicating that if the signal strength of the active pilot signal is anything less than 1.5 (i.e., $10^{2/10}$) times the strength of the pilot signal from base station B an idle handoff will be initiated.

The present invention improves upon the conventional algorithm by adding variables that weight the algorithm according to the position of the mobile station relative to the active and potentially new base stations. Other variables that may be added account for the situation where the earliest arriving multipath component of a pilot channel does not correspond to the signal that has traveled the shortest distance from the corresponding base station to the mobile station. To improve reliability in this situation, the position variables for each pilot channel are multiplied by the ratio of the earliest arriving multipath component strength to the total strength for each pilot channel. Mathematically, the improved algorithm with both types of variables may be expressed as follows:

If $[E_A(t_i) - E_B(t_i)] + [(M \times (POS_A(t_i) - POS_A(t_{i-1})) \times Ee_A(t_i)/E_A(t_i)) - (N \times (POS_B(t_i) - POS_B(t_{i-1})) \times Ee_B(t_i)/E_B(t_i))] < H$, then initiate idle handoff, where $E_A(t_i)$ and $E_B(t_i)$ are the signal strengths in dB of the active pilot channel and base station B pilot channel respectively at pilot sample time $t_i$, $POS_A(t_i)$ and $POS_A(t_{-1})$ are the time or phase offsets (i.e., positions) associated with the earliest arriving usable multipath signals received by the mobile station from that active base station A at pilot sample times $t_i$ and $t_{i-1}$ respectively, $t_{i-1}$ denoting a previous mobile station sample time, $POS_B(t_i)$ and $POS_B(t_{i-1})$ are the time or phase offsets (i.e., positions) associated with the earliest arriving usable multipath signals received by the mobile station from base station B at pilot sample times $t_i$ and $t_{i-1}$, respectively, $Ee_A(t_i)$ and $Ee_B(t_i)$ are the signal strengths in dB of the earliest arriving usable multipath pilot channel signal from the active base station A and base station B respectively at pilot sample time $t_i$, and M, N and H are design parameters.

Design parameter H is the same as in the original handoff algorithm. Design parameters M and N however, allow system engineers to further control when an idle handoff will be initiated by affecting the weight given to each position term in the improved algorithm. For instance, if system engineers seek to have each position term equally affect the decision whether to initiate an idle handoff, then M would be set equal to N. On the other hand, if system engineers seek to have the position relative to the active base station exert more influence on the decision, then M would be set greater than N. Typical values for the design parameters are: M=approximately 0.8 to approximately 1.1; N=approximately 1.0 to approximately 1.5; and H=approximately 2.0 to approximately 3.0. In a preferred embodiment of the invention M=1.0, N=0.9 and H=2.0.

Referring now to FIGS. 2A and 2B, illustrations of how the invention may effect an idle handoff decision in a wireless communications system are depicted. In FIG. 2A, a mobile station at time $t_{i-1}$, is at position 205, which is in the idealized coverage areas 201, 202 of base station A 203, the active base station, and base station B 204. At time $t_i$, the mobile station has not moved and is at position 206, which is the same as position 205. Accordingly, the distance from the mobile station to base station A at times $t_{i-1}$, 207 and $t_i$ 208 have not changed. The same is true of the distance from the mobile station to base station B at times $t_{i-1}$ 209 and $t_i$ 210. One skilled in the art will therefore appreciate that in this scenario both of the position terms in the improved algorithm will have zero values, and the decision whether to initiate an idle handoff will be made according to the conventional handoff algorithm. In FIG. 2B though, the mobile station has moved towards the active base station 203 in between pilot channel sample times. Therefore, the distance from the mobile station to base station A 203 at time $t_i$ 208 has changed relative to its distance at time $t_{i-1}$ 207. Distance 207 is greater than distance 208. Similarly, the distance from the mobile station to base station B 204 at time $t_i$ 210 has changed relative to its distance at time $t_{i-1}$ 209. Distance 209 is smaller than distance 210 because the mobile station has moved further away from base station B 204 in between pilot channel sample times. This results in the active base station A position term of the improved algorithm having a value less than zero because the phase offset of the first usable multipath signal arriving at the mobile at time $t_i$ from base station A will likely be smaller than the phase offset of the first usable multipath signal that arrived from base station A at time $t_{i-1}$, the signal having traveled a shorter distance in comparison to the travel time for the previous sample at time $t_{i-1}$. Similarly, the base station B position term will have a value greater than zero because the phase offset of the first usable multipath signal arriving at the mobile at time $t_i$ from base station B will likely be larger than the phase offset of the first usable multipath signal that arrived from base station B at time $t_{i-1}$, the signal having traveled a longer distance in comparison to the travel time for the previous sample at time $t_{i-1}$. The likely result of the foregoing is a weighting against initiation of an idle handoff. The same principle applies with respect to motion away from the active base station 203 and towards base station B 204, except that the improved algorithm will likely be weighted towards initiating an idle handoff to base station B 204.

One having skill in the art will readily appreciate from the foregoing description of the preferred embodiment that the invention provides a more reliable method and system of performing mobile station handoffs while in the Idle State. The invention therefore helps to ensure that messages intended for a mobile station will not be missed, excess mobile station battery power will not be consumed and system resources will not be unnecessarily taxed due to unwanted or inadvertent idle handoffs. The previous description of the preferred embodiment is provided only to enable one ordinarily skilled in the art to make or use the present invention. Various modifications to these embodiments however will be readily apparent to those skilled in the art, and the generic principles defined herein may be applied to other embodiments without the use of inventive faculty. For instance, one skilled in the art will appreciate that the methods and systems for providing improved idle handoffs described above in the context of a CDMA system may be readily implemented in any wireless communication system, such as cellular systems, wireless local loop telephone (WLL) systems, and the like without the exercise of inventive faculty. Cellular systems include, by way of example only, AMPS (analog), IS-54 (North American TDMA), GSM (worldwide TDMA), and IS-95 (North American CDMA). Hence, the present invention is not to be limited to the specific embodiments shown and described herein, but is to be accorded the widest scope consistent with the principles and novel features disclosed and claimed herein.

That which is claimed is:

1. A method of initiating idle handoff of a mobile station in a wireless communications system, comprising the steps of:

(A) obtaining first and second samples of a first pilot signal radiated by a first base station, said first sample occurring at a first time and said second sample occurring at a second time;

(B) obtaining third and fourth samples of a second pilot signal radiated by a second base station, said third sample occurring at said first time and said fourth sample occurring at said second time;

(C) determining whether the sum of the difference between the total strengths of said second and fourth samples and a position-weighting term is less than a first design parameter; and (D) initiating idle handoff of said mobile station from said first base station to said second base station if said sum is less than said first design parameter.

2. The method of claim 1 wherein the value of said position-weighting term (PW) is determined in accordance with the following equation:

$$PW=[M\times(POS_A(t2)-POS_A(t1))]-[N\times(POS_B(t2)-POS_B(t1))]$$

where M is a second design parameter, N is a third design parameter, $POS_A(t2)$ comprises a value related to the distance of said mobile station from said first base station at said second time, $POS_A(t1)$ comprises a value related to the distance of said mobile station from said first base station at said first time, $POS_B(t2)$ comprises a value related to the distance of said mobile station from said second base station at said second time, and $POS_B(t1)$ comprises a value related to the distance of said mobile station from said first base station at said first time.

3. The method of claim 1 wherein the value of said position-weighting term (PW) is determined in accordance with the following equation:

$$PW=[M\times(POS_A(t2)-POS_A(t1))\times(Ee_A(t2)/E_A(t2))]-[N\times(POS_B(t2)-POS_B(t1))\times(Ee_B(t2)/E_B(t2))]$$

where M is a second design parameter, N is a third design parameter, $POS_A(t2)$ comprises a value related to the distance of said mobile station from said first base station at said second time, $POS_A(t1)$ comprises a value related to the distance of said mobile station from said first base station at said first time, $POS_B(t2)$ comprises a value related to the distance of said mobile station from said second base station at said second time, $POS_B(t1)$ comprises a value relate to the distance of said mobile station from said first base station at said first time, $E_A(t2)$ comprises said total strength of said second sample, $E_B(t2)$ comprises said total strength of said fourth sample, $Ee_A(t2)$ comprises the strength of the earliest arriving usable multipath component of said second sample, and $Ee_B(t2)$ comprises the strength of the earliest arriving usable multipath component of said fourth sample.

4. The method of claim 2 or 3, wherein $POS_A(t2)$ comprises the phase offset of the earliest arriving usable multipath component of said second sample, $POS_A(t1)$ comprises the phase offset of the earliest arriving usable multipath component of said first sample, $POS_B(t2)$ comprises the phase offset of the earliest arriving usable multipath component of said fourth sample, and $POS_B(t1)$ comprises the phase offset of the earliest arriving multipath component of said third sample.

5. The method of claim 1 wherein said wireless communications system is a cellular communications system.

6. The method of claim 1 wherein said wireless communications system is a CDMA system.

7. The method of claim 6 wherein said mobile station is in the idle state and said first and second pilot signals comprise first and second pilot channels.

8. The method of claim 7 wherein said total strengths of said samples are calculated by adding the ratios of energy per chip of said pilot. channels to total spectral density of at most k usable multipath components of said pilots received during said samples.

9. The method of claim 1 wherein said mobile station periodically performs said sampling steps.

10. The method of claims 1, 2 or 3 wherein said first design parameter has a value in the range of approximately 2.0–approximately 3.0.

11. The method of claims 2 or 3 wherein said second design parameter has a value in the range of approximately 0.8–approximately 1.1, and said third design parameter has a value in the range of approximately 1.0–approximately 1.5.

12. A system for determining whether to initiate idle handoff in a wireless communications system, comprising:

(A) a first base station radiating a first pilot signal;

(B) a second base station radiating a second pilot signal; and (C) a mobile station having an integrated chip capable of executing software; and (D) a set of software instructions executed by said chip for:
  (i) obtaining first and second samples of said first pilot signal, said first sample occurring at a first time and said second sample occurring at a second time;
  (ii) obtaining third and fourth samples of said second pilot signal, said third sample occurring at said first time and said fourth sample occurring at said second time;
  (iii) determining whether the sum of the difference between the total strengths of said second and fourth samples and a position-weighting term is less than a first design parameter; and
  (iv) initiating idle handoff of said mobile station from said first base station to said second base station if said sum is less than said first design parameter.

13. The system of claim 12 wherein the value of said position-weighting term (PW) is determined in accordance with the following equation:

$$PW=[M\times(POS_A(t2)-POS_A(t1))]-[N\times(POS_B(t2)-POS_B(t1))]$$

where M is a second design parameter, N is a third design parameter, $POS_A(t2)$ comprises a value related to the distance of said mobile station from said first base station at said second time, $POS_A(t1)$ comprises a value related to the distance of said mobile station from said first base station at said first time, $POS_B(t2)$ comprises a value related to the distance of said mobile station from said second base station at said second time, and $POS_B(t1)$ comprises a value related to the distance of said mobile station from said first base station at said first time.

14. The system of claim 12 wherein the value of said position-weighting term (PW) is determined in accordance with the following equation:

$$PW=[M\times(POS_A(t2)-POS_A(t1))\times(Ee_A(t2)/E_A(t2))]-[N\times(POS_B(t2)-POS_B(t1))\times(Ee_B(t2)/E_B(t2))]$$

where M is a second design parameter, N is a third design parameter, $POS_A(t2)$ comprises a value related to the distance of said mobile station from said first base station at said second time, $POS_A(t1)$ comprises a value related to the distance of said mobile station from said first base station at said first time, $POS_B(t2)$ comprises a value related to the distance of said mobile station from said second base station at said second time, $POS_B(t1)$ comprises a value relate to the distance of said mobile station from said first base station at said first time, $E_A(t2)$ comprises said total strength of said second sample, $E_B(t2)$ comprises said total strength of said fourth sample, $Ee_A(t2)$ comprises the strength of the earliest arriving usable multipath component of said second sample, and $Ee_B(t2)$ comprises the strength of the earliest arriving usable multipath component of said fourth sample.

15. The system of claim 13 or 14, wherein $POS_A(t2)$ comprises the phase offset of the earliest arriving usable multipath component of said second sample, $POS_A(t1)$ comprises the phase offset of the earliest arriving usable multipath component of said first sample, $POS_B(t2)$ comprises the phase offset of the earliest arriving usable multipath component of said fourth sample , and $POS_B(t1)$ comprises the phase offset of the earliest arriving multipath component of said third sample.

16. The system of claim 12 wherein said wireless communications system is a cellular communications system.

17. The system of claim 12 wherein said wireless communications system is a CDMA system.

18. The system of claim 17 wherein said mobile station is in the idle state and said first and second pilot signals comprise first and second pilot channels.

19. The system of claim 18 wherein said total strengths of said samples are calculated by adding the ratios of energy per chip of said pilot channels to total spectral density of at most k usable multipath components of said pilots received during said samples.

20. The system of claim 12 wherein said mobile station periodically performs said sampling steps.

21. The system of claim 12, 13 or 14 wherein said first design parameter has a value in the range of approximately 2.0–approximately 3.0.

22. The system of claim 13 or 14 wherein said second design parameter has a value in the range of approximately 0.8–approximately 1.1, and said third design parameter has a value in the range of approximately 1.0–approximately 1.5.

23. A system for initiating idle handoff of a mobile station in a wireless communications system, comprising:

(A) means for obtaining first and second samples of a first pilot signal radiated by a first base station, said first sample occurring at a first time and said second sample occurring at a second time;

(B) means for obtaining third and fourth samples of a second pilot signal radiated by a second base station, said third sample occurring at said first time and said fourth sample occurring at said second time;

(C) means for determining whether the sum of the difference between the total strengths of said second and fourth samples and a position-weighting term is less than a first design parameter; and (D) means for initiating idle handoff of said mobile station from said first base station to said second base station if said sum is less than said first design parameter.

24. The system of claim 23 wherein the value of said position-weighting term (PW) is determined in accordance with the following equation:

$$PW=[M \times (POS_A(t2)-POS_A(t1))]-[N \times POS_B(t2)-POS_B(t1))]$$

where M is a second design parameter, N is a third design parameter, $POS_A(t2)$ comprises a value related to the distance of said mobile station from said first base station at said second time, $POS_A(t1)$ comprises a value related to the distance of said mobile station from said first base station at said first time, $POS_B(t2)$ comprises a value related to the distance of said mobile station from said second base station at said second time, and $POS_B(t1)$ comprises a value related to the distance of said mobile station from said first base station at said first time.

25. The system of claim 23 wherein the value of said position-weighting term (PW) is determined in accordance with the following equation:

$$PW=[M \times (POS_A(t2)-POS_A(t1)) \times (Ee_A(t2)/E_A(t2))]-[N \times (POS_B(t2)-POS_B(t1)) \times (Ee_B(t2)/E_B(t2))]$$

where M is a second design parameter, N is a third design parameter, $POS_A(t2)$ comprises a value related to the distance of said mobile station from said first base station at said second time, $POS_A(t1)$ comprises a value related to the distance of said mobile station from said first base station at said first time, $POS_B(t2)$ comprises a value related to the distance of said mobile station from said second base station at said second time, $POS_B(t1)$ comprises a value relate to the distance of said mobile station from said first base station at said first time, $E_A(t2)$ comprises said total strength of said second sample, $E_B(t2)$ comprises said total strength of said fourth sample, $Ee_A(t2)$ comprises the strength of the earliest arriving usable multipath component of said second sample, and $Ee_B(t2)$ comprises the strength of the earliest arriving usable multipath component of said fourth sample.

* * * * *